United States Patent [19]

Aczel et al.

[11] Patent Number: 4,970,721
[45] Date of Patent: Nov. 13, 1990

[54] RESOURCE-DECOUPLED ARCHITECTURE FOR A TELECOMMUNICATIONS SWITCHING SYSTEM

[75] Inventors: Andrew L. Aczel, Kanata; Robert W. Pfeffer, Nepean; Frank Mellor, Ottawa; Ernst A. Munter, Kanata, all of Canada

[73] Assignee: Northern Telecom Limited, Montreal, Canada

[21] Appl. No.: 465,826

[22] Filed: Jan. 16, 1990

[30] Foreign Application Priority Data

Sep. 29, 1989 [CA] Canada ................................. 614699

[51] Int. Cl.⁵ ............................................. H04J 3/24
[52] U.S. Cl. .................................... 370/92; 370/58.1; 370/94.1
[58] Field of Search .................... 370/58.3, 58.2, 62, 370/58.1, 92, 94.1, 60

[56] References Cited

U.S. PATENT DOCUMENTS

| | | | |
|---|---|---|---|
| 4,213,201 | 7/1980 | Gagnier | 370/62 |
| 4,450,557 | 5/1984 | Munter | 370/67 |
| 4,670,626 | 6/1987 | Fisher | 370/58.2 |
| 4,685,100 | 8/1987 | Coppens | 370/58.3 |
| 4,698,809 | 10/1987 | Munter | 371/30 |
| 4,750,165 | 6/1988 | Champagne | 370/24 |
| 4,761,779 | 8/1988 | Nara | 370/58.2 |
| 4,816,826 | 3/1989 | Munter | 340/825.52 |

Primary Examiner—Douglas W. Olms
Assistant Examiner—Christopher O. Edwards
Attorney, Agent, or Firm—F. P. Turpin

[57] ABSTRACT

The invention provides a telecommunications system exhibiting an architecture having a plurality of functional levels decoupled from one another by data transport systems. The communication facilities connected to the periphery of the system are terminated at the physical level only and the data is channelized for transmission through a channel switch to a first level of processing that provides channel services. The data is then multiplexed and transmitted to system and call processing resources via a frame transport system.

18 Claims, 8 Drawing Sheets

RESOURCE-DECOUPLED ARCHITECTURE FOR A TELECOMMUNICATIONS SWITCHING SYSTEM

FIELD OF THE INVENTION

The invention relates generally to a telecommunications switching system and more particularly to a resource decoupled architecture for such a system.

PRIOR ART DESCRIPTION

In the past few decades, telephone switching systems have evolved continuously at an accelerated rate. The electromechanical systems such as crossbar offices gave way to stored program centrally controlled switching systems. These systems were then continuously enhanced as technological progress permitted until finally the contemporary fully digital switching systems were put into service.

Throughout their evolutionary steps, all the existing systems have maintained a similar general architecture that usually comprises a central control unit for processing calls and directing the operations of the central office generally, a peripheral system for interfacing to telephone lines and trunks, and a switching network for interconnecting various ones of the lines and trunks. Of course, various other subsystems, such as input-output devices are also present.

The current generation of digital switching systems have been optimized by building-in a substantial amount of distributed processing. In order to maximize call processing capacity, and at the same time to allow for modular growth, the functions to be done by the central call processor are held to a minimum and lower level signalling and call processing functions are relegated as much as possible to the peripheral subsystems.

Thus, a peripheral subsystem combines a number of functions which appear to naturally group together; it provides an interface function between a diverse external world in terms of protocols and electrical interfaces and a unified switch internal world which typically includes a TDM (Time Division Multiplexing) switching network, a message passing facility and a central processor. Thus, the functions conventionally allocated to a current "intelligent" peripheral unit often include A/B bit signalling (as well as C/D bits for superframes), MF and DTMF signalling, ISDN D-channel signalling, cellular radio control signalling, time switching for application of tones and tone receivers and for concentration of voice channels, digit collection and call supervision, call progress tones as well as ringing control and answer. The implementation of these functions as well as others has resulted in highly complex peripheral units.

In practice, the design of a peripheral unit is a compromise of packaging flexibility, built-in expansion capability, and processing capability to handle a range of services and functions. Thus, it is much easier to optimize a peripheral unit dedicated primarily to one type of service than one intended for a broad range of services.

When services differ significantly in their attributes such as PCM (Pulse Code Modulation) bandwidth requirement, signalling methods employed and amount of call processing necessary, a designer must choose between creating engineerable varieties of the peripherals or under-utilizing an over-engineered "universal" peripheral. In the first case, a large administrative load is generated both for the manufacturer and the user, and in the second choice, higher product cost is incurred which has the most impact in the lowest complexity and most frequent services such as POTS (Plain Old Telephone Service).

A further problem arises when completely new or unforeseen services or interfaces have to be accommodated. If these cannot be provided by modification of the existing design, it becomes necessary to develop new peripherals. This has happened in the past, as for example when so-called specialized business telephone sets were introduced in the last few years and it is happening presently with the introduction of ISDN (Integrated Services Digital Network) and the DS-3 high order data rate format. In the near future, a similar problem will be encountered with the introduction of the Sonet format and the ATM (Asynchronous Transfer Mode) broadband services.

It is therefore an object of the invention to provide a resource decoupled architecture for a telecommunications switching system.

It is a further object of the invention to provide a telecommunications switching system architecture that allows the flexible assignment of resources within the system to the provision of services.

It is a still further object of this invention to provide a switching system architecture that minimizes the impact of new telephone network services and new data formats on the peripheral interface subsystem of a switching system to the telephone network.

SUMMARY OF THE INVENTION

The invention provides a system architecture whereby the distributed processing power of the peripheral units is limited to that which is necessary to adapt the formats of the external signals to the switching system internal format in terms of timing and information channel arrangement. All the data information appearing at the telephone network side of the peripheral units is reformatted and passed into the switching system for further processing at various levels. At a first level, the signalling information is transduced and transmitted to a high capacity call processor that completes the process at a second level. It is therefore much easier to provide additional peripheral units to accommodate new services since all intelligent or semi-intelligent functions such as the various line and trunk signalling schemes do not need to be re-implemented for the new units.

Basically, the switch architecture described herein provides a highly flexible arrangement wherein it is possible to provide new functions and services by increasing the processing power of the system at its core by the addition at the second level of one or more processors suitably programmed to provide the required new functions and services. In fact, as will become evident from the ensuing description, the switch architecture of the invention makes it possible to provide a telephone switching system that is a fully intelligent node in the telephone network; that is, it makes it practically possible to provide a switching system capable of interfacing to almost any transmission facility to provide POTS services for toll and/or end office functions including custom calling services as well as function as an integrated node for network elements such as service switching point (SSP), signal transfer point (STP) and service control point (SCP).

In accordance with the invention, there is provided an architecture for a telecommunications system comprising a plurality of functional levels. A first level provides a peripheral physical interface to the outside world and functions to channelize the data appearing on the communications facilities connected thereto. The channelized data is passed to a digital signal processing means via a channel switching network which effectively decouples the peripheral interface from the processing means. The latter functions to provide protocol conversion, channel services and message multiplexing of the received channelized data. At a further level, there is provided a frame switch having a plurality of ports wherein the switch is adapted to route a message between any two of its ports in accordance with routing information contained in the message. The frame switch functions to connect the digital signal processing means to call processing resources at a yet further level thereby decoupling one from the other.

From another aspect, the invention provides an architecture for a telecommunications system comprising a first circuit means for providing physical terminations for communication facilities and for providing channelized data corresponding to the data on the communication facilities. A second circuit means provides protocol conversion, channel services and message multiplexing of the channelized data. The first and second circuit means are connected by a channel switch for passing channelized data therebetween. A third circuit means for providing system control and call processing resources to the telecommunications system is connected to the second circuit means via a frame switching means.

From yet another aspect, the invention provides a telecommunications switching system comprising a frame switch having a plurality of ports, the switch being adapted to route a message between any two of its ports in accordance with routing information contained in the message. A plurality of application processors are each connected to a respective port of the frame switch and at least one of the processors is suitably programmed to control the operation of the switching system and another one is suitably programmed to process telephone calls. A channel switch is connected to receive channelized data and to switch the data between predetermined ones of its input and output ports under control of one of the processors. An interface circuit connects the plurality of communication facilities from the outside world to the switching system and is adapted to format the information on the communication facilities into channelized data compatible with the channel switch. A transducer circuit connected between predetermined ports of the channel switch and at least one port of the frame switch formats the channelized data from the channel switch into packetized data compatible with the frame switch and formats the packetized data from the frame switch into channelized data compatible with the channel switch.

As mentioned above, the known switching system architectures tend to be service-specific and are difficult to expand and modify because the services/resources are tailored to maximum specific requirements. Once these are reached, expansion of the capabilities usually entail the redesign of the central processor and other functional units such as the peripheral interface units.

On the other hand, the architecture of the invention provides for the variable provisioning of the resources at various levels independently of other levels. For example, the call processing resources are located at a single level decoupled from the remainder of the system by a frame transport system. Whenever greater call processing resources are required, additional processors may be connected to the frame switch whereby they are able to communicate with the existing processing resources as well as the remainder of the system. Similarly, the provisioning of channel services may be modified even extensively without affecting the peripheral equipment since they are provided by resources decoupled from the periphery by a channel switching network.

It should also be realized that the provision of new services to a switching system structured in accordance with the invention requires only that additional physical terminations for the communication facilities be provided and that the software of the processing resources be altered to provide the new services. This may be achieved without modification to the channel and frame transport systems and without re-engineering the peripheral units.

An embodiment of the invention will now be described in conjunction with the drawings in which.

Figure 1:
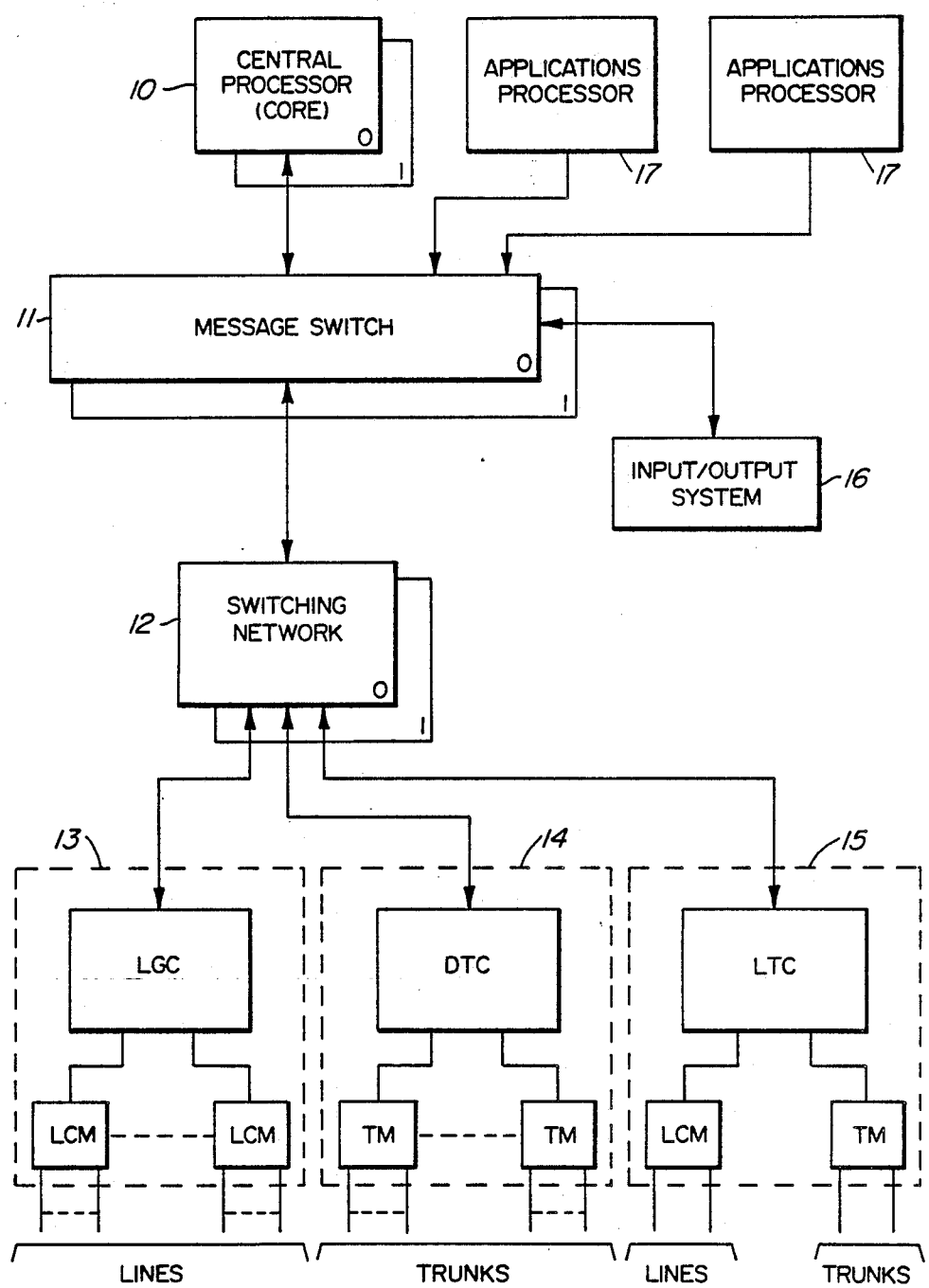
FIG. 1 is a block circuit diagram illustrating a typical architecture of prior art telecommunications systems.

FIG. 1 illustrates an architecture for a telecommunications switching system that is representative of contemporary systems in existence throughout the world. A full description of such a system may be found in U.S. Pat. No. 4,213,201 issued Jul. 15, 1980, as well as in the publications "Telesis-four" 1980 and "Telesisthree" 1983, published by Bell-Northern Research Ltd. Such systems have evolved greatly in the past few years and FIG. 1 represents one of the more common systems presently in use in the North American telephone system.

FIG. 1 shows a system having a duplicated processing core 10, each half comprising a high capacity processor with all the necessary data and program stores to perform the functions associated with call processing. A message switch 11, also duplicated, serves to route messages between the core 10 and a switching network 12 comprising a pair of identical parallel planes. The data passing through the network is switched through both planes for reliability considerations.

In the more recent evolution of this system, the message switch 11 is a high-speed, high-capacity frame switch having a plurality of ports. All the components or subsystems of the switching system are connected directly or indirectly to the switch 11 and are thus able to communicate with each other in a very quick and uniform manner. This arrangement thus allows any port on a peripheral unit to have access to the call processing core or any of applications processors 17. New functions can be added and the capacity of the system may be increased by connecting additional processors to respective ports of the switch 11. The frame switch 11 is fully duplicated and normally runs in loadsharing mode even though each individual unit may be capable of carrying the full messaging load on its own. The ports of the system function in complete independence of one another, and communication between them takes place on a port-to-port basis over the switch 11 rather than multi-port to single port. This loose coupling between ports is made possible by having each data packet entering a port carrying a logical address as well as a physical address. This is fully described in U.S. Pat. No. 4,816,826 issued on Mar. 29, 1989.

The switching network 12 is a junctorless, nonblocking expandable switch that interconnects 64 kb/s voice and data channels. The network 12 provides the switching function for peripheral to peripheral traffic entering and exiting the network via the peripheral links as well as the messaging paths between the peripherals, the processing core 10 and the message switch 11; the latter may be provided through semi-permanent nailed-up connections within the matrix. The network 12 is composed of two identical planes and reliability is achieved by a duplex arrangement where all connections are established in both planes and peripherals are connected to identical ports in both planes. Thus, a true network path between any two end points is guaranteed in a single fault situation. Each plane of the network 12 may, for example, consist of a 128K channel matrix divided into four units each having 32K input channels and 32K output channels. The input channels are broadcast to the other units so that each unit has a total input capacity of 128K channels. Each unit can switch any of the 128K input channels to any of the 32K output channels. In this way, the four units provide a total of 128K inputs by 128K outputs non-blocking switching paths. A better understanding of this switching network may be obtained from U.S. Pat. No. 4,450,557.

In view of their high-speed and high-capacity, the three main elements of the system are interconnected by high capacity DS-512 fiber optic links. These links are capable of carrying up to 511 ten-bit data bytes or PCM channels and one channel for link synchronization. The link between the channel switch 12 and the message switch 11 carries many time-multiplexed message channels, whereas each of the duplicated computing modules of the processing core is connected (not shown) to both planes of the message switch 11 to provide the required level of reliability.

The network 12 may be connected on the peripheral side to the outside world via a variety of peripheral units represented in FIG. 1 by a line group controller (LGC) peripheral unit 13, a digital trunk controller (DTC) unit 14, and a line-trunk controller (LTC) unit 15. These peripheral units include interface circuits such as line concentrator modules (LCM) and trunk modules (TM) for connection to the lines and trunks of the telephone network. Descriptions of this type of circuit are available from the above-identified U.S. Pat. No. 4,213,201 and various other publications. Of course, a typical system would also include other subsystems especially an input/output system 16 for connection to outside facilities such as operation and maintenance equipment.

The hardware structure of the system just described is based on a distributed processing architecture. Processors are located in the processing core 10, the message switch 11, the switching network 12 as well as in each of the LGC, DTC, LTC, LCM and TM. This structure relieves the processing core of such routine functions as scanning, supervision and digit collection, all of which are real-time intensive. The functional elements of the system communicate via serial digital data links according to predetermined formats and protocols such as DS-30, DS-30A, DS-1, DS-512 and HDLC as well as DMS-X and DMS-Y. Descriptions of these may be found, for example, in U.S. Pat. Nos. 4,750,165 and 4,698,809, both issued to the assignee of the present invention. Of course, DS-1 (e.g. T1 carrier) is the basic standard for digital transmission within the North American telephone network.

As is generally well-known, the known peripheral units that interface subscriber lines must perform such tasks as signal processing, line supervision, line ringing and tone generation. Speech signal processing converts analog speech signals into digital PCM and formats it to be consistent with that of the internal communications links of the system. In addition, such a subsystem must be able to handle dial pulse and dual-tone-multifrequency (DTMF) signalling as well as provide concentration of the line appearances, the latter being usually achieved through time switching techniques within the peripheral units.

On the other hand, a trunk circuit interfaces the switching system to the remainder of the worldwide telephone network. Although, the DS-1 (1.544 Mb/s) format is a standard for the North American system, it exists in many multiples such as DS-2 (6.312 Mb/s) and DS-3 (44.736 Mb/s). Other formats and protocols are also increasingly being used such as the common channel signalling protocols CCIS-6 and CCS-7 as well as HDLC and other specialized data transmission schemes including cellular radio control signalling. Therefore, a DTC unit must be able to interface to a large variety of external sources of data and format it to be compatible with the switching system. This is usually achieved by provisioning the peripheral trunk unit with a mix of specialized trunk circuits intended to meet the expected traffic conditions to and from the various locations.

A peripheral unit such as the LTC 15 provides an interface to the network for a mixture of lines and trunks. The peripheral ports to the unit are apportioned to lines and trunks depending on the expected traffic.

In addition to the multitude of functions that they must be able to perform, peripheral units of a switching system are continuously being evolved to handle new transmission facilities and new services. For example, the existing systems are presently being evolved to handle integrated services digital network (ISDN) services, integrated services node functions, and intelligent node functions as well as being adapted to handle new data rates such as DS-3 (43.736 Mb/s) and new optical transmission data formats such as Sonet.

The re-engineering of existing peripheral units of a system to handle new services or a new mix of existing services usually entails changing the software of the processor in the peripheral units as well as the interface hardware. This, for example, is the case with ISDN, DS-3 and Sonet because their implementation exceeds the usual built-in expansion capability and processing capability of existing peripheral units.

Figure 2:
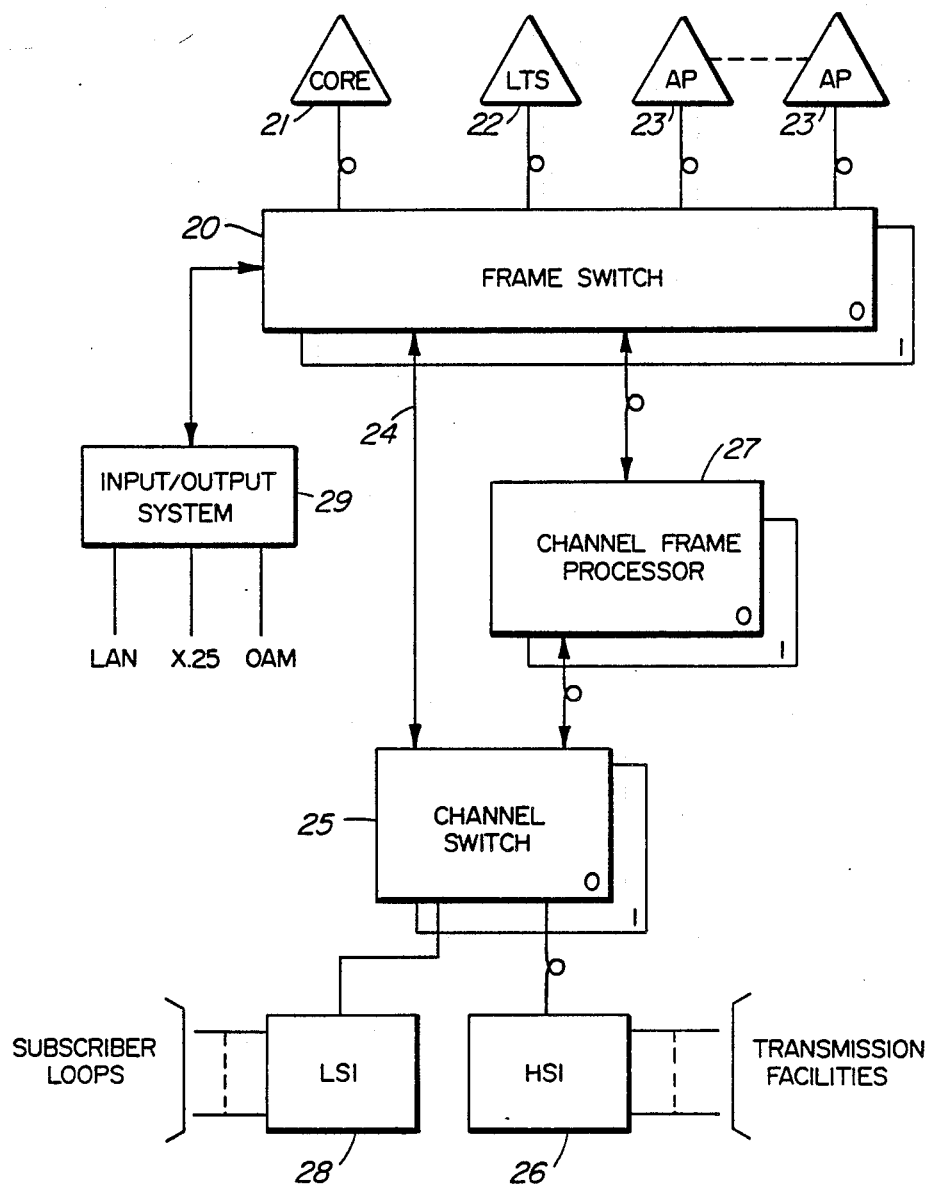
FIG. 2 is a block circuit diagram of a telecommunications system in accordance with the invention.

FIG. 2 is a block diagram of a switching system in accordance with the invention; it represents a radical departure from any known system in that the peripheral units of the system terminate only the physical layer portion of the user/network interface. The remainder of the processing functions are separated from the interface by the channel switch which permits a flexible allocation of resources under software control. The diagram shows a frame switch 20 having a plurality of input/output ports for connection to various units such as a call processing processor (CORE) 21, an application processor labelled line/trunk server (LTS) 22 and other application processors 23. A control link 24 is also provided to allow control signals to be transferred between the CORE processor and a channel switch 25. The switch 25 has ports connected to a high-speed interface (HSI) unit 26 as well as to a low-speed interface unit (LSI) 28; it also has ports connected to a channel frame processor (CFP) 27 which in turn is connected to the frame switch 20.

The frame switch 20, core processor 21 and the channel switch 25 may be the same type as the similarly identified units described fully in conjunction with FIG. 1. The switch 25 is a non-blocking timeswitching network providing constant delay and unrestricted NX64 Kbit services and broadband services up to the capacity of the network. The switch 25 derives timing from the DS-512 links from the frame switch 20. The switch control processor software may be downloaded and the network connections controlled via messages received on the control link 24.

As mentioned briefly above, the major difference between the HSI and LSI peripherals and the prior art peripheral units such as exemplified in FIG. 1, is that the HSI and LSI peripherals terminate only the physical layer portion of the user/network interface. User/network signalling information, in the form of common channel signalling as for example D-channel in ISDN PRA (primary rate) and CCS7 or associated signalling such as AB bits and MF is passed transparently via the channel switch 25 to the CFP 27. Processing by various application circuits within the CFP 27 allows access by these signalling streams to the frame switch 20 and hence access to call processing resources that may be resident in the call processor 21 or LTS 22 or one of the application processors 23.

The HSI peripheral module is designed to support physical termination of high speed transmission facilities such as DS-1 and DS-3 and may be readily adapted to support ISDN and Sonet data. The functions of the HSI peripheral include the physical termination of both network planes including integrity and parity checks, the per-channel network plane selection and the DS-0 channel formatting and rate conversion between the channel switch 25 and the outside transmission facilities. Other functions include maintenance and alarm processing as well as slip control, clock recovery, line driving and all other functions conventionally related to termination of the physical layer of the facility interface.

The channel-frame processor 27 is basically a connection subsystem adapted to provide various channel/frame interface functions. As described in detail below, the CFP may contain a flexible mix of individual application circuit packs (ACPs) which interface channel-oriented signalling such as AB bits and multifrequency (MF), channelized message-based signalling such as ISDN D-channels and TR-303 messaging links and user data signals between the channel and frame switches. Whereas the HSI unit channelizes the signalling information for transmission through the channel switch 25, the CFP recognizes the signalling and prepares frame messages for transmission through the frame switch 20 to the appropriate processor. The various units of the system illustrated in FIG. 2 are preferably interconnected with optical fiber links in order to take advantage of its broadband capability, reduced electromagnetic interference (EMI) radiation and reduced EMI susceptibility. The links may carry 10B12B encoded data in a DS-512 format as described in U.S. Pat. No. 4,698,809. The fiber links are identified by a small loop along their length.

An input/output system 29 has one or more ports connected to the frame switch 20 for communicating with the remainder of the system including processors 21 to 23 and other ports for connection to an operations administration and maintenance (OAM) center as well as framed data sources such as Ethernet and X.25 data links.

Line Trunk Server

The line/trunk server shown as LTS 22 in FIG. 2 may, in practice, be a software call processing application running on an application processor. For all practical purposes it may be considered as a part of the call processing processor 21. The combination illustrates the capability of deloading the core processor by allocating some functions of the core processor to another processor and have the processors communicate via the frame switch 20. Of course, an LTS module may also be a duplex computer module similar to the CORE processor 21, complete with the necessary memory elements. Similarly, new applications may be added to the system by the addition of application processors 23.

On existing switching systems, the major call processing and maintenance subsystems are distributed between the call processor and the peripheral modules and overall coordination of these systems occurs in the central processor. In the system of FIG. 2 on the other hand, the major call processing and maintenance relationships have been migrated from the peripheral units to the LTS 22. Carrier maintenance is the only system that remains in the access peripheral and the coordination of these systems remains in the central processor 21. The use of the LTS processor thus allows the call processing services currently implemented on the system of FIG. 1 to be used in the system of FIG. 2 with minimal changes; the CORE processor now communicates with the LTS instead of the access peripheral units to achieve call processing. The LTS basically replaces the functionality of the finite states machines in the prior art peripheral units, including protocol processing. The terminal specific attributes of lines and trunks such as signalling receivers, D-channel handlers, and the like are allocated and maintained by the LTS and not the core processor as in the prior art systems. Thus, FIG. 2 represents a radical departure from the existing systems in that future or expanded services required of the switching system will only require the addition of peripheral hardware necessary to provide for the new format or services with minimal impact on the existing hardware.

Channel Frame Processor

As mentioned above, the CFP provides numerous resources/services that may be allocated to peripheral interfaces under software control. It provides frame relay of HDLC framed data via the message switch for applications such as IDLC messaging, DS-1 performance reporting, D-channel ISDN access signalling and/or user data services at rates up to DS-1. It also provides multiplexing of peripheral messaging links for relay to the switch core via the message switch as well as supporting channel service circuit applications such as tone senders/receivers, conference bridges and the like.

These three categories of functions are implemented by different applications hardware within the single architectural framework of the CFP common equipment. In this respect, the CFP is a generic subsystem which provides an environment for the deployment of applications specific resources and these may be digital signal processors implemented as respective application circuits (ACP).

Figure 3:
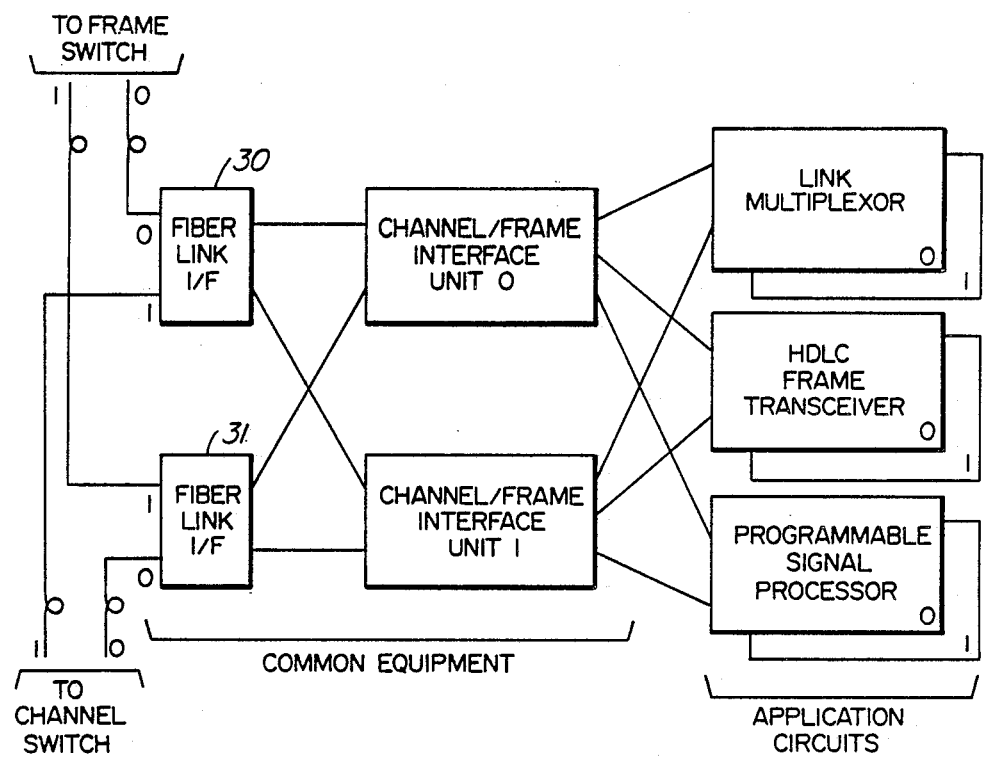
FIG. 3 is a block circuit diagram of the channel frame processor circuit shown in FIG. 2.

As shown in FIG. 3, the architecture of the CFP is partitioned into a common equipment section and an application equipment section. The common equipment is responsible for providing the interface between the application equipment and the remainder of the telecommunications switching system. It consists of a duplicated pair of channel/frame interface (CFI) units 0 and 1 shown connected to the duplicated units of the frame switch 20 and to the duplicated units of the channel switch 25 via fiber interface circuits (FIC) 30 and 31 and optical fiber links. The application equipment section is shown to comprise three duplicated ACPs: a message link multiplexer (LMX), an HDLC frame transceiver (HFT) and a programmable signal processor (PSP). Other ACPs such as a digital announcement controller may of course be added to this architecture.

The interface on the channel side is by means of a duplex fiber link to each plane of the switching network 25 and on the frame side, to each frame switch unit.

The interface between the CFIs and the ACPs is by means of serial links dedicated to each pair of ACPs. The serial links are derived from the fiber links by a multiplexing function that essentially allocates a portion of the channel and frame side bandwidth to an ACP pair. There are three such serial links to each pair of ACPs from each CFI unit; one which carries the channel side traffic and two which carry the frame side traffic destined to each frame switch unit. The frame side serial links also carry hardware signalling registers (not shown) that transport status information between the CFIs and ACPs. As mentioned above, the application equipment may consist of a plurality of ACPs that may be deployed as duplicated pairs or as independent units. In either case, a pair of ACPs shares the serial links to the CFIs. It may be noted that all ACP variants are required to offer an identical interface to the common equipment.

Each of the main circuit packs, CFIs and ACPs, are independently controlled having an on-board processor (MCS) and dedicated system message links. Messaging to all circuit packs is accessible to the core processor of the system in all states, (active, inactive etc.,). Note also that messaging between the circuits is also available and may be used to synchronize the CFP subsystem software activities. The intercircuit messaging may utilize an external data path via the frame switch units.

As mentioned above, the fiber interface circuits 30 and 31 are spared or duplicated as components of the fiber links to the two network planes and the frame switch units. On the other hand the CFIs may be hot-spared so that service can be assumed by the inactive unit without loss of context or data.

Figure 4:
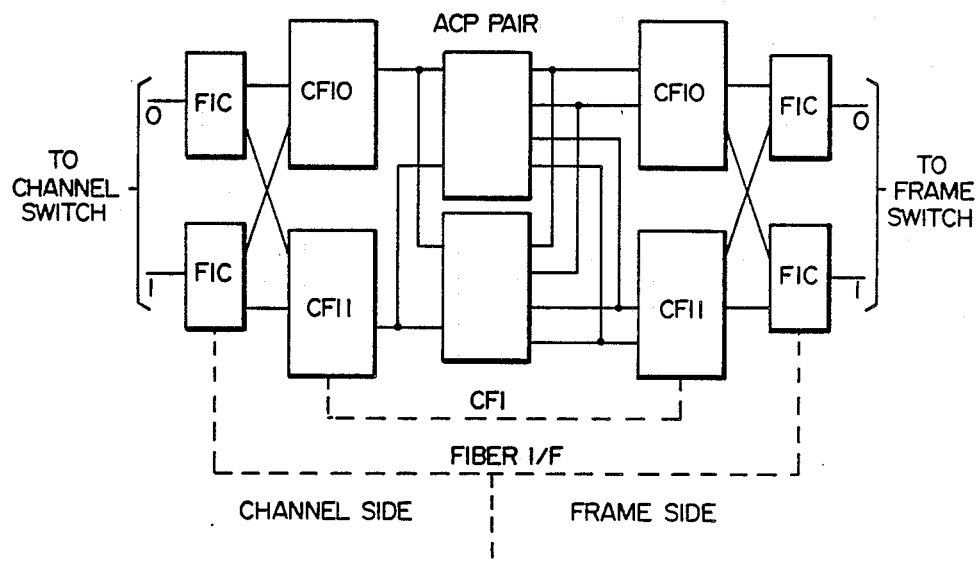
FIG. 4 is a diagram showing the configuration topology of the circuit shown in FIG. 3.

FIG. 4 illustrates the "unfolded" view of the architecture of the CFP and shows the topology of the channel side separately from the frame side. The drawing essentially indicates that two quite distinct data paths in the CFI exist for the channel side and the frame side data path respectively and how each duplicated pair of ACPs is connected to the duplicated CFIs and fiber interface circuits. For the purpose of describing data flow in the CFP, "receive" refers to data flowing towards an ACP and "transmit" refers to data flowing from an ACP. This definition will be used for both the frame and channel sides.

Figure 5:
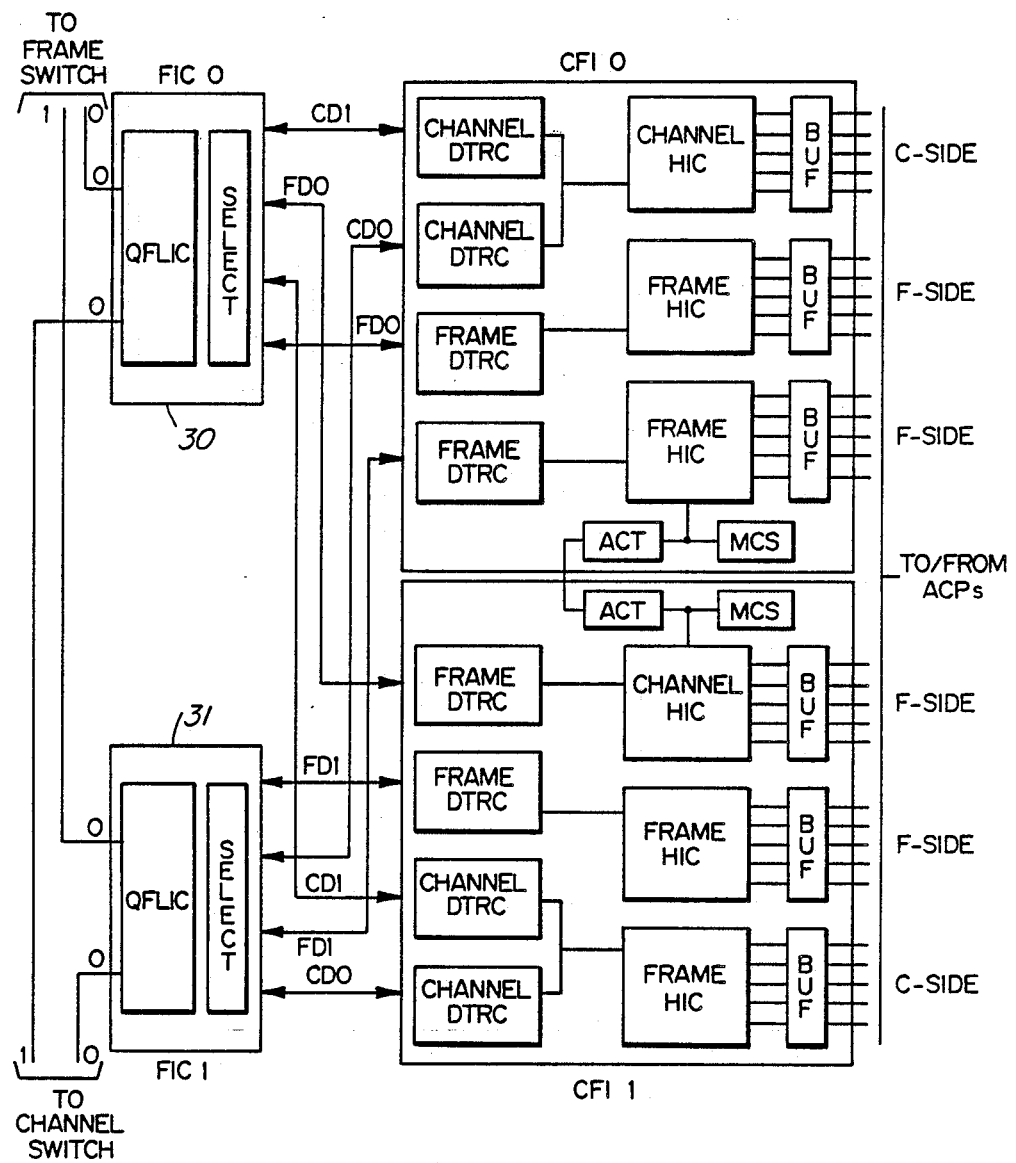
FIG. 5 is a logic block diagram of the common equipment circuit shown in FIG. 3.

FIG. 5 is a logic block diagram of the common equipment illustrated in FIGS. 3 and 4 and may be used to further explain the operation thereof. As described above, each of fiber interface circuits 30 and 31 terminates a fiber link from a network plane and converts the optical signal for interface to a quad fiber link interface circuit (QFLIC). For the receive direction, the QFLIC extracts the clock and frame pulse and converts the data between the serial link rate to a parallel format which is used for interface to the CFIs. The data and timing signals are interfaced to each of the CFI units independently in the transmit direction. The CFI selects the data and timing source from the active CFI unit as indicated by a CFI activity status circuit (ACT). The timing of the receive data is driven by a clock and frame pulse derived from the fiber link. In the transmit direction the timing is driven by the active CFI. As is conventional in the art, a switch of activity between the CFIs allows the switching of the common equipment from one to the other upon failure of the active CFI.

In the receive direction, each CFI interfaces the serial data paths from each of the FICs to a receive/transmit circuit (DTRC). At this point, the incoming channel side data path consists of two data streams CDI and CDO one from each of the FICs representing the two planes of the network. The data from the two DTRCs is multiplexed for interface to a host interface circuit (HIC) over a single interface.

In the transmit direction, ten serial links are received from the ACPs being five pairs which are logically ORRED into five signals interfaced to the channel HIC. The HIC converts the serial data into a parallel format and broadcasts the same data to the two DTRCs over a single interface. The DTRCs, one for each plane of the network, encode the data into the fiber link code and the resulting data is driven over parallel interfaces to the two fiber interface circuits 30 and 31.

The channel side data path terminates at the application hardware of an ACP as discussed below. The serial links are interfaced to a HIC on the ACP which converts them to parallel format. A connection memory controls the allocation of the timeslots to the application hardware.

Frame Side Data Path

The basic difference between the data path for the channel side and for the frame side is that the channel side data is plane referenced and the frame side data is load shared. Thus, the frame side data has a separate and dedicated data path through the common equipment for each of the frame switch units.

The data to and from the FICs is interfaced to two frame DTRCs one per frame switch unit. The data from the frame DTRCs is fed to two separate frame HICs to form a pair of dedicated data paths each consisting of a DTRC-HIC pair. The HICs demultiplex the fiber link timeslots into five serial links which are exchanged with a possible five pairs of ACPs, each link being broadcast to a pair of ACPs in the receive path and logically ORRED from a pair in the transmit path.

As described below, the frame side data path terminates at the application hardware of an ACP. The serial links are interfaced to a HIC on the ACP which converts the data to parallel format.

The multiple serial/parallel and parallel/serial conversions employed in the CFP allow the use of high speed connections between various portions of the circuit which may be physically separated due to packaging considerations.

Figure 6:
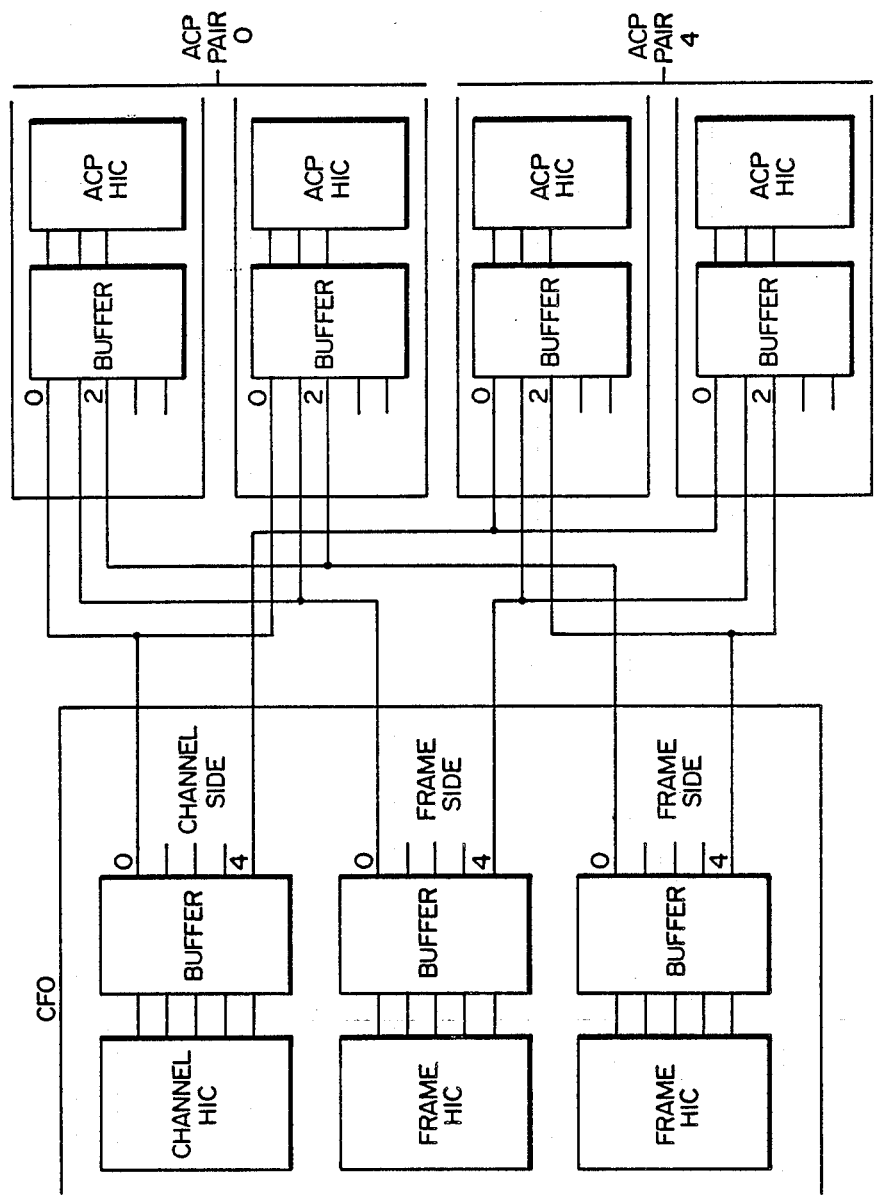
FIG. 6 is a logic block diagram illustrating the interface interconnection between the common equipment and the application circuits shown in FIG. 3.

FIG. 6 illustrates the interconnection topology between one channel interface unit and two pairs of ACPs.

Application Circuit Structure

As described earlier, the channel frame processor is interposed between the channel switch 25 and the frame switch and acts to multiplex the channelized information into framed information and vice-versa. At the same time, it is provided with facilities to perform applications and services on the data received via these two switches.

Applications/services are grouped into specialized functions adapted to be performed by specialized application circuits. Examples of some of these were earlier identified in FIG. 3 as link multiplexer, HDLC frame transceiver, and programmable signal processor.

A link multiplexer (LMX) is used to relay peripheral system messaging between the peripherals and the system switch processing core. The LMX multiplexes a number of peripheral messaging links interfaced on the channel side of the CFP to a high bandwidth payload link to each of the message switch units on the frame side of the CFP. The LMX is provided with processing capability for the termination and routing of messages originating at the periphery. Since messages are duplicated over each switching network plane and recovered transparently to the software, peripherals are relieved of the need to recover from failure of the channel switch. All messaging data is now assembled at the new peripherals and forwarded through the switching network to the LMX for further disposition.

An HDLC frame transceiver (HFT) is used to terminate the HDLC framing and to relay HDLC frame data between end user access and the frame switch of the system. The HFT implements the framing sub layer of the layer 2 protocol for HDLC frame data interfaced on the channel side and to the message switch on the frame side. The data passed may be ISDN access signalling on a D-channel or may be destined for N user data services. The HFT provides HDLC frame termination and routing for ISDN B and D channels, as well as frame relay services and IDLC remote messaging.

A programmable signal processor (PSP) provides for flexible channel service circuit applications. These applications may be down-loadable from the core processor. The PSP provides a programmable signal processing resource for application in telephony voice or data channels. The core of the PSP function is a plurality of digital signal processor (DSP) cells. The DSP cells interface to both the channel side and to the frame side links and support channel-in/channel-out and channel-in/frame-out applications.

Figure 7:
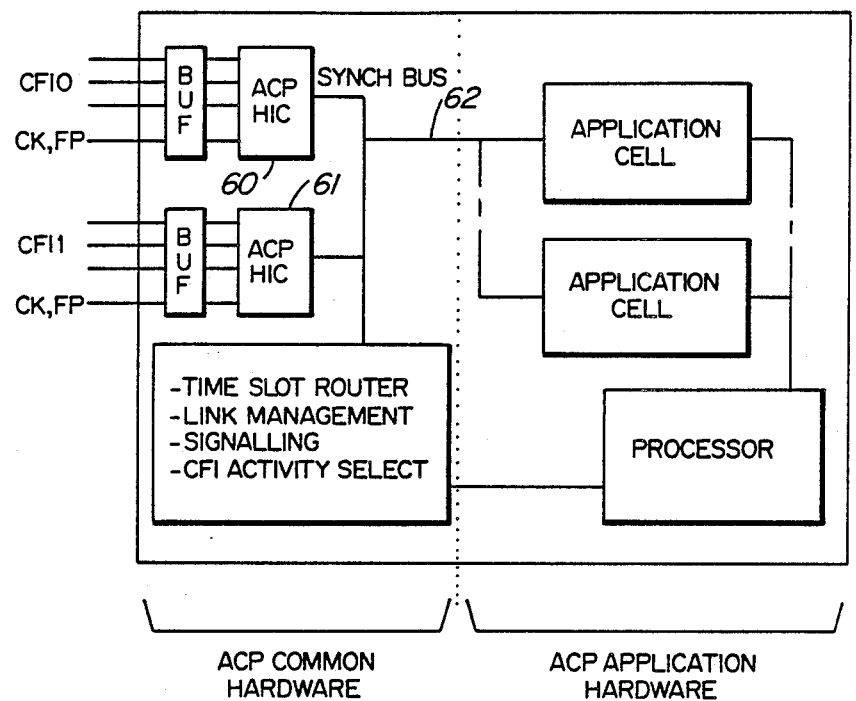
FIG. 7 is a logic block diagram of an application circuit shown in FIG. 3.

FIG. 7 of the drawings illustrates a circuit structure common to the ACPs so that they present a common functional interface to the CFP common equipment. The ACP structure is divided into a common hardware section and an application hardware section. The common hardware implements the functionality or interface with the CFIs. A pair of HICs 60, 61 terminates the serial links to and from each CFI unit and provide conversion of the serial data on the links to parallel data on a bus 62 interconnecting the circuit functions of the ACP. The ACP common hardware thus basically provides the interface functions between the ACP application hardware and the CFI hardware.

The ACP application hardware comprises application cells realized by a processor suitably programmed to achieve the desired functions using the data obtained from the bus 62.

Subsystem synchronization is controlled by the CFIs which lock into an external timing reference and distribute the resulting clock and frame pulses to the other circuit. These are shown connected as inputs to the ACP common hardware. Basically, the external reference for the subsystem timing is taken from the frame switch fiber links.

Activity Control

In order to ensure ruggedness of the system, each duplicated circuit pack pair is able to determine activity (ACT) autonomously and to switch the activity independently over all others. This is made possible by cross-coupling between the CFIs and each ACP pair using serial links; this eliminates common modes of failure and interdependency in hardware. CFI activity state is made independent of the applications by ensuring that the CFI activity switch is hitless to the data paths and synchronization; ACP activity is made transparent to the CFI because the ORRING of the shared serial links is controlled by the ACPs.

System Reset Control

The channel frame processor system is able to be reset remotely from either of the frame switch units using the reset system described in U.S. Pat. application Ser. No. 153,947 filed Feb. 9, 1988. The reset will be signalled to the CFP by the insertion of an alarm code sequence into the frame side fiber link by the frame switch unit. The insertion is accomplished under software control by the frame switch fiber interface circuit board. Each alarm code of a given sequence is inserted into all timeslots on the link. Two alarm code reset sequences enable the CFIs to be reset individually. The reset is used following initial subsystem commissioning or if the telecommunication switching system determines that the CFP unit is insane.

An active CFI is able to generate a reset to the mate CFI and to each of the ACP circuits independently. The reset of an active ACP by the CFI will initiate an ACP activity switch.

Telephone Network Interface

As mentioned above and as shown in FIG. 2, the system of the invention interfaces to the outside world via interface circuits compatible with various transmission sources such as DS-1, DS-3, Sonet. The interface circuits function to channelize the data from the various transmission sources into a format compatible with that of the channel switch 25.

Figure 8:
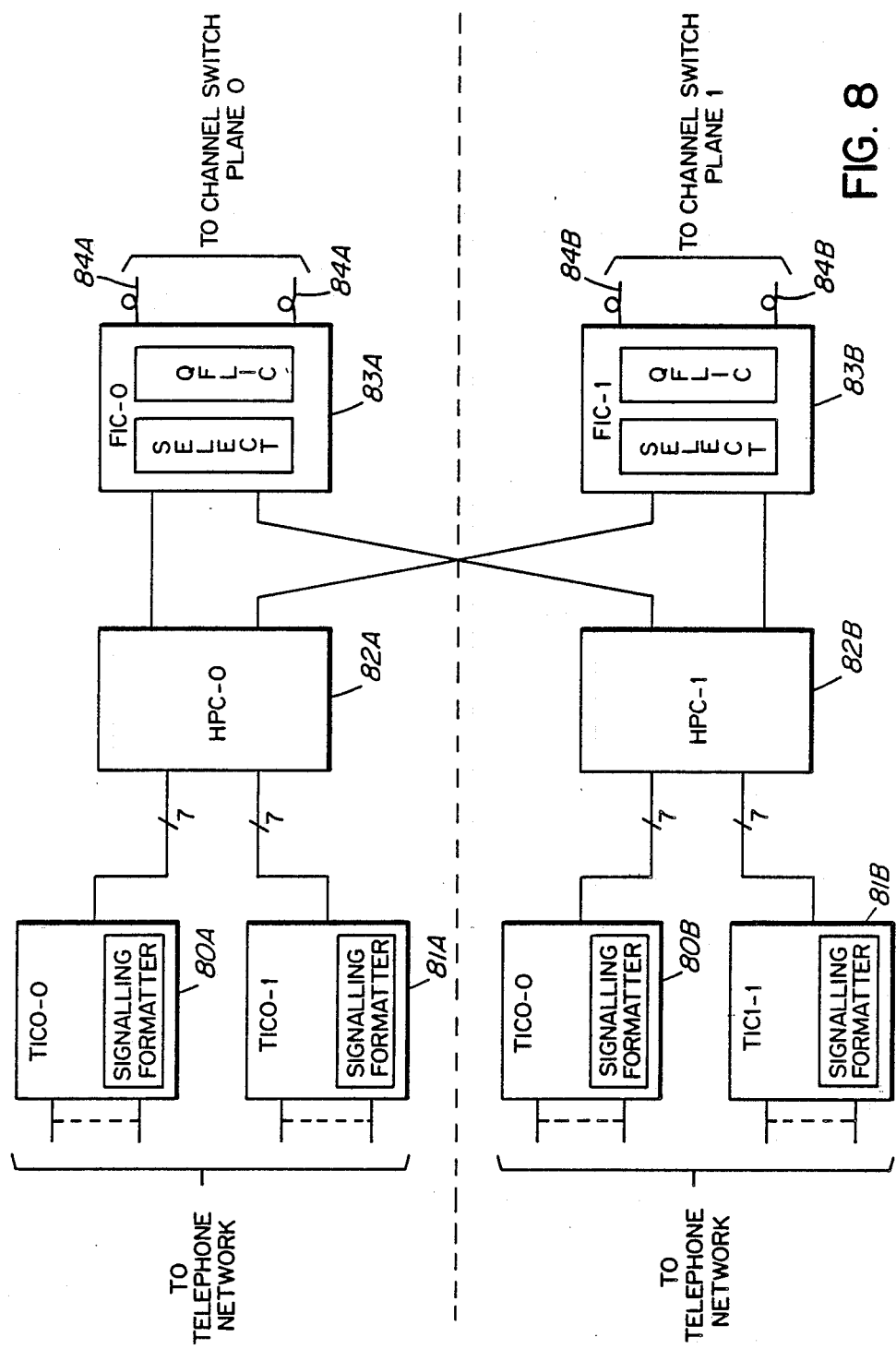
FIG. 8 is a block diagram of a peripheral interface circuit shown in FIG. 2.

FIG. 8 is a block diagram of an example interface circuit adapted to handle DS-1 data. Two pairs of trunk interface circuits (TIC) 80A, 81A and 80B, 81B are each connected to a plurality (e.g. 28) of DS-1 transmission sources and respond thereto to provide the conventional data recovery functions as well as error detection, rate and protocol conversion and clock recovery. The TICs are also provided with a circuit for the recovery and reformatting into a distinct stream of the signalling information (e.g. A,B,C,D bits) embedded in the DS-1 data streams.

The TICs, 80 and 81 generate a plurality of serial data streams (e.g. 7) carrying 8 MHz data and these are converted to a plurality of parallel data streams in a pair of host processor circuits (HPC) 82A and 82B and then fed to planes 0 and 1 of the channel switch via a pair of FICs 83A and 83B and fiber links 84A and 84B. As described above in conjunction with FIG. 5, each FIC includes a select circuit for selecting the data from one or the other of the HPCs as well as formatting circuitry to generate DS-512 data and interface to fiber optic links 84A and 84B.

Figure 9:
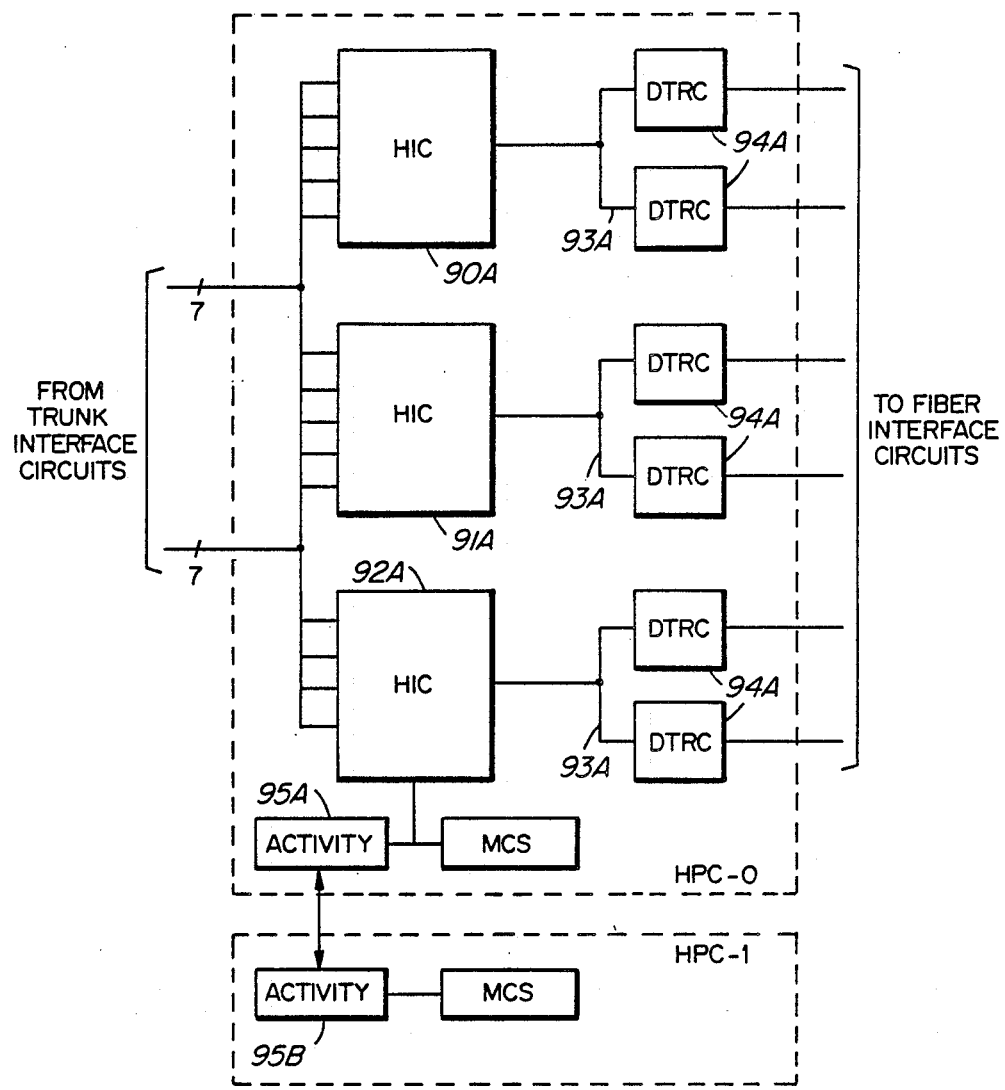
FIG. 9 is a logic block diagram of a portion of the circuit shown in FIG. 8.

FIG. 9 is a block logic diagram of HPC 82A or 82B. It shows the connection of the serial data links from the TICs 80 and 81 to a plurality of host interface circuits (HIC) 90A, 91A and 92A which generate parallel data on buses 93A connected to DTRCs 94A which in turn generate data compatible with the FICs 83A and 83B. Each of the HPCs 82A and 82B also include activity circuitry 95A and 95B and a micro-controller system (MCS) 96A and 96B. Of course, the activity circuits are interconnected as well as connected to the select circuits of the FICs 83A and 83B.

Although the telephone network interface subsystem of FIG. 8 was described using DS-1 data sources as an example, it should be clear that the system is able to interface to any other facility of the telephone network simply by replacing the TICs with circuitry adapted to convert whatever appears on the transmission facility to data streams compatible with the HPCs. It should also be realized that altering the mix of transmission facilities connected to the system simply entail the provision of the corresponding mix of interface cards to the telephone network since the services/resources of the switch are not provided at the periphery.

It is thus seen that the invention provides a novel architecture for a telecommunications system wherein the peripheral access to the switch is achieved strictly at the physical level and wherein the services and resources of the switch are provided through the use of logical peripherals created by processing resources within the switch and which may be altered and/or expanded on demand.

A resource decoupled architecture such as described herein has the flexibility to support a virtually infinite range of services; it is able to responsively and efficiently reconfigure generic channel and frame processing resources to address any conceivable service which can be supported on a wide variety of narrowband, wideband and broadband interfaces.

We claim:

1. A telecommunications system comprising:
   first circuit means for providing physical terminations for communication facilities and for converting the data on the communication facilities to channelized data;
   second circuit means comprising digital signal processing resources for providing protocol conversion channel services and message multiplexing of the channelized data;
   a channel switch connected between the first and second circuit means for passing channelized data therebetween;
   third circuit means for providing system control and call processing resources to the telecommunications system; and
   a frame transport system for passing data between the second and third circuit means comprising a frame switch having a plurality of ports, the switch being adapted to route a message between any two of its ports in accordance with routing information contained in the message.

2. A telecommunications system as defined in claim 1 wherein the channel switch is a non-blocking circuit switching network.

3. A telecommunications system as defined in claim 2 wherein the channel switch is capable of switching contiguous nx64 Kb/s connections where n is an integer less than 25.

4. A telecommunications system as defined in claim 3 wherein the first circuit means includes means for controlling bandwidth allocation of the channelized data.

5. A telecommunications system as defined in claim 2 wherein the digital signal processing resources include a first digital signal processor for providing protocol conversion, a second digital signal processor for providing channel services and a third digital signal processor for providing message multiplexing.

6. A telecommunications system as defined in claim 5 wherein the frame switch, the channel switch and the second circuit means are interconnected with fiber optic data links.

7. A telecommunication system as defined in claim 1 and further comprising an interface circuit means connected to the frame transport system for providing physical terminations for communication facilities carrying packet data and for transceiving the data between the communication facilities and the frame transport system.

8. A telecommunications switching system comprising:
   a frame switch having a plurality of ports, the switch being adapted to route a message between any two of its ports in accordance with routing information contained in the message;
   a plurality of processors each one being accessible via a port on the frame switch; one of the processors being suitably programmed to control the operation of the switching system and another one being suitably programmed to process telephone calls;
   a channel switch adapted to receive channelized data and switch the data between predetermined ones of its input and output ports under control of one of the processors;
   an interface circuit for connection to a plurality of communication facilities and for formatting the information on the communication facilities into channelized data compatible with the channel switch;
   a transducer circuit connected between predetermined ports of the channel switch and at least one port of the frame switch for formatting the channelized data from the channel switch into packetized data compatible with the frame switch and for formatting the packetized data from the frame switch into channelized data compatible with the channel switch.

9. A telecommunications switching system as defined in claim 8 wherein the interface circuit includes means for stripping the signalling data from the data on the communication facilities and for channelizing it in a format suitable for transmission through the channel switch.

10. A telecommunications switching system as defined in claim 9 wherein the transducer circuit comprises means responsive to the signalling data for translating it to signalling information and for formatting it into messages suitable for transmission through the frame switch to the call processor.

11. A telecommunications switching system as defined in claim 10 wherein the channel switch is a non-defined blocking circuit switching network.

12. A telecommunications switching system as defined in claim 11 wherein the frame switch, the channel switch, the transducer circuit and the interface circuit are interconnected with fiber optic data links carrying data at the DS-512 level or a submultiple thereof.

13. A telecommunications system comprising, means for connecting the system to transmission facilities carrying data;
means for interfacing the transmission facilities at he physical level and for channelizing the data on the transmission facilities;
a digital signal processing means for providing channel services on the channelized data;
means for passing the channelized data between the interfacing and channelizing means to the digital signal processing means, thereby decoupling one from the other;
circuit means for providing system control and call processing resources; and
means for connecting the digital signal processing means to the circuit means for providing system control and call processing resources comprising a frame switch having a plurality of ports, the switch being adapted to route a message between any two of its ports in accordance with routing information contained in the message.

14. A telecommunications system as defined in claim 13 wherein the means for passing the channelized data between the interfacing and channelizing means to the digital signal processing means is a channel switching network.

15. A telecommunications system as defined in claim 14 wherein the channel switching network is nonblocking.

16. A telecommunications system as defined in claim 15 wherein the channel switching network may be controlled to carry nx64 Kb/s data on contiguous 64 Kb/s channels where n is an integer.

17. A telecommunications system as defined in claim 16 wherein the circuit means for providing system control and call processing resources comprises a plurality of processors each connected to a respective port of the frame switch.

18. A telecommunications system as defined in claim 16 and further comprising an interface communication facilities carrying packet data and for converting the packet data to a format compatible to that of the frame switch, the interface circuit means being connected to at least one port of the frame switch.

* * * * *

UNITED STATES PATENT AND TRADEMARK OFFICE
CERTIFICATE OF CORRECTION

PATENT NO. : 4,970,721
DATED : November 13, 1990
INVENTOR(S) : Andrew L. Aczel et al It is certified that error appears in the above-identified patent and that said Letters Patent is hereby corrected as shown below:

Column 15:
Claim 11, line 2, the phrase "non-defined blocking" should read --non-blocking--;

Claim 13, line 4, the word "he" should be --the--; and
Column 16:
Claim 18, line 2, after the word "interface" insert --circuit means for providing physical terminations for--.

Signed and Sealed this

Ninth Day of February, 1993

Attest:

STEPHEN G. KUNIN

*Attesting Officer*                Acting Commissioner of Patents and Trademarks